United States Patent [19]
Jeffers

[11] Patent Number: 5,503,242
[45] Date of Patent: Apr. 2, 1996

[54] PROPELLER DRIVEN SNOW BUGGY

[76] Inventor: Terry E. Jeffers, P.O. Box 78, Hyattville, Wyo. 82428

[21] Appl. No.: 314,403
[22] Filed: Sep. 27, 1994
[51] Int. Cl.⁶ .................................................. B62B 17/04
[52] U.S. Cl. ........................ 180/182; 180/190; 280/16; 280/21.1; 280/22.1; 280/666; 440/37
[58] Field of Search ................................. 180/182, 190; 280/16, 21.1, 22.1, 666; 440/37

[56] References Cited

U.S. PATENT DOCUMENTS

| | | | |
|---|---|---|---|
| 2,905,479 | 9/1959 | Schomers | 280/16 |
| 3,785,330 | 1/1974 | Fox | 114/270 |
| 3,814,197 | 6/1974 | Milankov et al. | 180/182 |
| 3,841,649 | 10/1974 | McMullen | 280/16 |
| 3,861,492 | 1/1975 | Jensen, Sr. | 180/182 |
| 4,189,019 | 2/1980 | Zech | 180/182 |
| 4,260,036 | 4/1981 | Bissett | 180/182 |
| 4,342,372 | 8/1982 | Hayes | 180/182 |
| 4,671,521 | 6/1987 | Talbot et al. | 280/21.1 |
| 4,796,902 | 1/1989 | Capra | 280/16 |

FOREIGN PATENT DOCUMENTS

| | | |
|---|---|---|
| 950008 | 6/1974 | Canada. |
| 1927405 | 12/1970 | Germany. |

*Primary Examiner*—Mitchell J. Hill
*Attorney, Agent, or Firm*—Richard C. Litman

[57] ABSTRACT

A propeller driven vehicle for traversing snow and ice covered terrain with improved steering response and stability. The vehicle has a motor driven propeller providing motive force to sustain forward motion of the vehicle regardless of terrain conditions. The vehicle rides on four skis which greatly enhance the stability of the vehicle and prevent the likelihood of tipping during sudden and severe turning. A parallelogram suspension system provides maximum contact between the skis and the terrain while allowing the skis to respond to vertical undulations in the terrain. A foot operated drag brake is mounted in the rear of the vehicle to decelerate the vehicle.

11 Claims, 4 Drawing Sheets

PROPELLER DRIVEN SNOW BUGGY

BACKGROUND OF THE INVENTION

1. Field of the Invention

The present invention relates to an improved propeller driven snow vehicle.

2. Description of the Prior Art

Prior attempts to develop a sport vehicle capable of safely and efficiently traversing terrain covered with snow and ice have generally continued along two lines: snowmobiles and air driven ski vehicles. Snowmobiles are by far the more common of the two with their endless track propulsion systems and motorcycle style bodies. Air powered vehicles are much rarer, and have in the past, conceptualized along a three ski theme design.

U.S. Pat. No. 2,905,479 issued to Schomers on Sep. 22, 1959 shows one such three ski vehicle with rear skis mounted on a complex parallelogram support to each other to provide simultaneous tilting of the two rear skis to mimic the slant of the terrain. Braking is provided by a drag brake.

U.S. Pat. No. 3,785,330 issued to Fox on Jan. 15, 1974 shows an air driven vehicle generally modeled after an airplane and includes three skis and a coil spring shock absorber retarding the downward movement of the two rear skis.

U.S. Pat. No. 3,841,649 issued to McMullen on Oct. 15, 1974 shows an open carriage pontoon-mounted vehicle with a rear mounted prop. Two side skis stabilize the vehicle, and steering is performed through a steerable ski mounted under the front portion of the pontoon.

U.S. Pat. No. 3,814,197 issued to Milankov et al. on Jun. 4, 1974 shows a skate mounted vehicle with a rear mounted fan. The single front skate is mounted on a pivot to provide steering control over the vehicle. Canadian patent 950,008 to Milankov et al. issued on Jun. 25, 1974, related to U.S. Pat. No. 3,814,197, discloses a three skated vehicle.

U.S. Pat. No. 3,861,492 issued to Jensen, Sr. on Jan. 21, 1975 shows a motorized ice-bike with three skates. A cable operated drag brake is attached to each rear ski to provide braking.

U.S. Pat. No. 4,189,019 issued to Zech on Feb. 19, 1980 shows a propeller-type propulsion unit mounted on the back of a skier by a suitable harness.

U.S. Pat. No. 4,260,036 issued to Bissett on Apr. 7, 1981 shows a powered ski vehicle mounted on a single runner. The angle of thrust provided by the prop engine can be varied to assist in steering the vehicle. In separate embodiments elevated pontoons provide lateral support to prevent the vehicle from tipping over.

U.S. Pat. No. 4,342,372 issued to Hayes on Aug. 3, 1982 shows a telescoping suspension on a snowmobile which has an internal shock absorber to limit compression of the telescoping arm connecting a front ski to the body of the snowmobile.

German Patent 1,927,405 to Nelson published on May 5, 1969 discloses a three skated vehicle with a single, front steerable skate.

The use and success of these three runner vehicles has been extremely limited in the past because of stability and responsiveness problems, as well as higher costs associated with these air powered vehicles. Prior designs of the three ski vehicle have been developed from modified airplane designs, rather than the more stable land vehicle designs. Aerodynamic factors have been given more design weight than the more practical aspects such as stability and steering control.

When a vehicle with one front ski maneuvers through a tight turn, the outside front corner of the vehicle can dip under the force of the centrifugal load, promoting the lifting of the opposite rear corner, threatening, and sometimes causing, tipping of the vehicle. In a best case scenario, the vehicle experiences tremendous understeer as the center of the loading of the steering moves away from the center ski towards the lowered corner of the vehicle. In answer to this instability which is inherent with a three-ski design, complicated devices have been developed such as the bulky rear parallelogram suspension shown in the Schomers patent, which compensate for the lack of stability of the vehicles.

In great contrast, the vehicle of the present invention overcomes these prior shortcomings and provides stability and mobility not present in the earlier devices. By implementing a four ski design with two front steerable skis, the vehicle gains a unexpected stability and control above and beyond the prior vehicles. By building a vehicle with two front skis and a broader base, the vehicle is much less likely to tip or roll during a turn.

With a four ski vehicle, the centrifugal force directs more weight to the outside front ski during a turn, increasing the friction between the ski and the terrain, assisting the ski in engaging the terrain to enhance the turning, rather than detracting from it. The outside ski, together with the suspension system connecting the ski to the vehicle, resist the rolling forces caused by turning and increase the stability of the machine. The four-ski vehicle is unique among the air driven vehicles and provides a new and exciting alternative to the mainline snowmobiles currently being produced.

None of the above inventions and patents, taken either singly or in combination, is seen to describe the instant invention as claimed.

SUMMARY OF THE INVENTION

Accordingly, it is a principal object of the invention to provide a snow vehicle with greater adaptability to the terrain by providing two front steerable skis to increase stability and enhance steering response.

It is another object of the invention to provide a snow vehicle with an improved ski suspension system to maintain level edges of the skis.

It is a further object of the invention to increase the amount of travel in the ski suspension system to provide a more stable vehicle through varied terrain.

Still another object of the invention is to improve stability and decrease the likelihood of rolling or tipping of the snow vehicle through the use of four skis.

It is a further object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
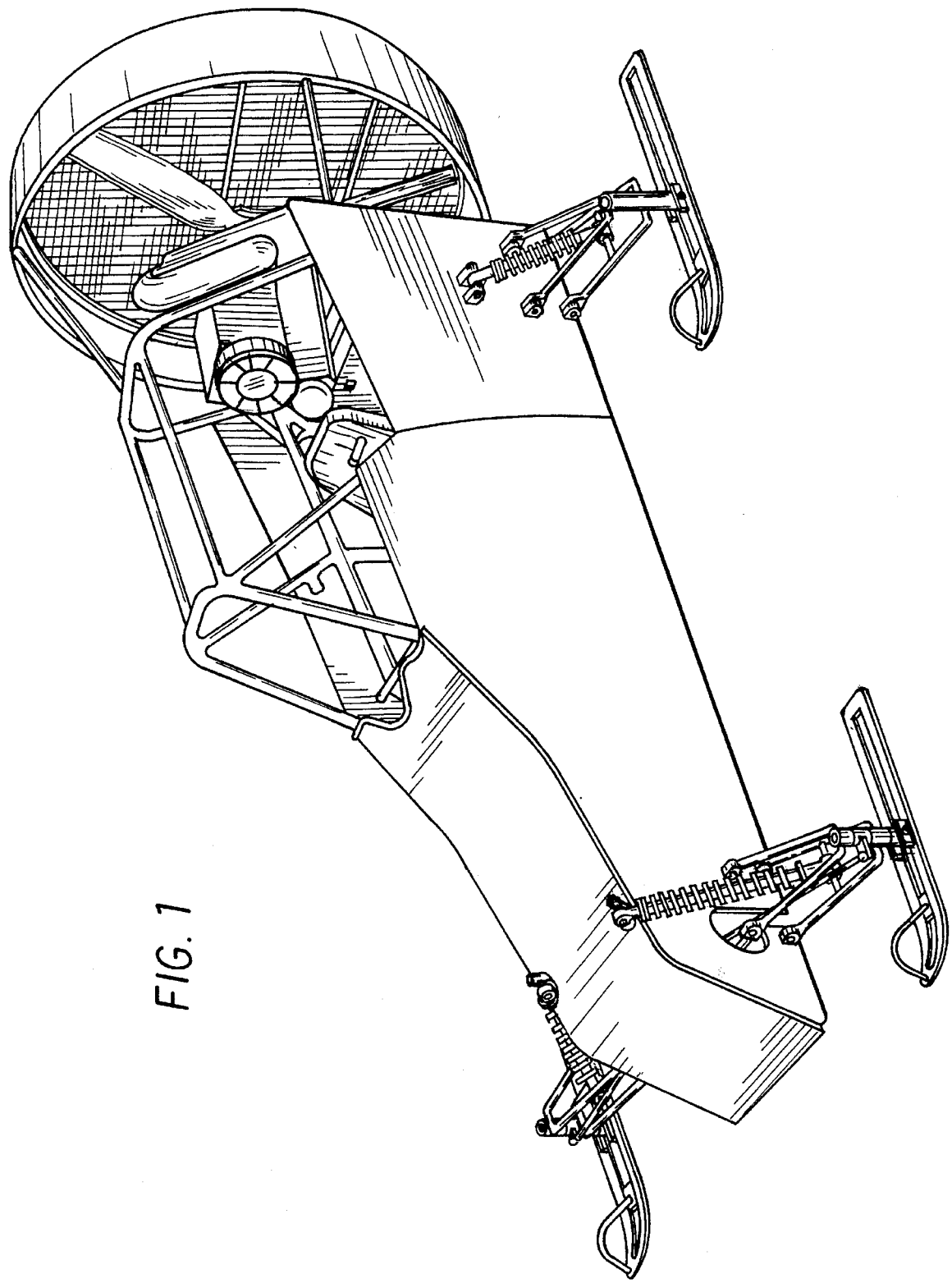
FIG. 1 is an environmental perspective view of the snow vehicle according to the present invention.

The present invention pertains to a snow vehicle, and more specifically to a propeller driven snow buggy capable of traversing ice and snow covered terrain at a high rate of speed. Specifically the invention relates to improvements in the suspension and stability of the snow vehicle.

Referring now to FIG. 1 and FIGS. 5–7, the snow vehicle or snow buggy (10) includes a main compartment body (12) for carrying a passenger not shown), a first suspension means for supporting two front steerable skis (14), a second suspension means for supporting two rear skis (16), and a motor (18) driving a propeller (20).

The body of the vehicle has a structural cage (22) formed by multiple tubes welded together to form a protective, secure enclosure for the driver. The lower and front portions of the body are covered by paneling (24) preferably made of sheet metal to protect the driver from the environment and from loose debris raised by the passage of the vehicle. The vehicle can be fully enclosed, but the vehicle top portion (26) is preferably left open for the sport enthusiast's enhanced enjoyment.

Suspended from the main body are four skis (14 and 16). The front two skis are attached to a steering wheel (28) by appropriate control rods (30) and gearing (not shown) to provide the driver with control over the vehicle. The rear skis track independently of the front skis and steering mechanisms, and are provided with a certain amount of lateral and vertical float to provide additional stability to the vehicle. Further details of the operation of the skis will be described below.

Propulsion of the vehicle is provided by a motorized propeller to ensure forward motion of the vehicle, regardless of traction characteristics of the terrain. A motor is located above and behind the driver and is responsive to the throttle inputs controlled by an accelerator pedal (not shown) at the driver's feet. An output shaft (not shown) of the motor (18) turns the propeller at a speed determined by the driver's throttle inputs. The propeller is surrounded by a shroud (32) both to channel force rearward and to protect the prop from foreign object damage. A screen (34) connected to the shroud is provided between the driver and the propeller to prevent the driver from contacting the propeller.

The propeller and motor can each be sized according to the needs of the intended driver, with a larger propeller diameter providing increased thrust, but requiring a higher horsepower engine. The propeller blade angles can be set to provide an optimal balance of idle efficiency and overall thrust. Many conventional motors and propellers are available which are capable of driving the vehicle in a sufficient manner.

Braking of the vehicle is preformed by a drag brake provided at the rear of the vehicle. A brake (not shown) pedal provided near the foot of the driver operates the drag brake by a cable, rod, hydraulic system, or suitable force transfer system. When the brake pedal is pressed, the drag brake is caused to extend downwardly to engage the surface of the terrain, slowing the vehicle through friction of the brake on the ground. One skilled in the art would also recognize that the braking system could alternatively be as simple as a hand operated drag brake, or as advanced as a thrust reverser system incorporated into the propeller system to decelerate the snow buggy. In any event, the braking system which may be employed forms no part of the instant invention per se and is not illustrated.

Figure 2:
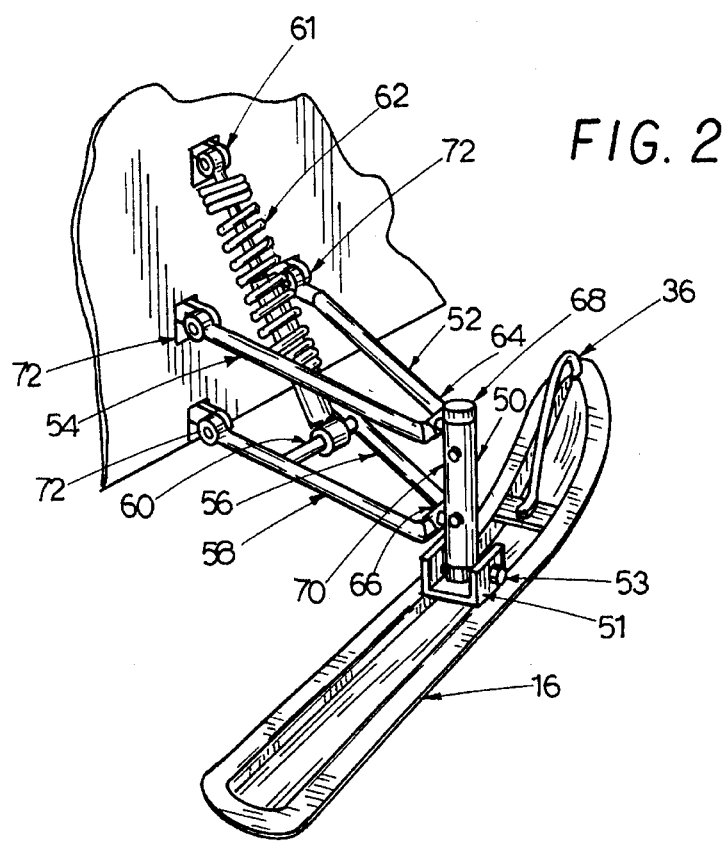
FIG. 2 is a fragmentary perspective of the suspension system and rear ski of the snow vehicle.
Figure 3:
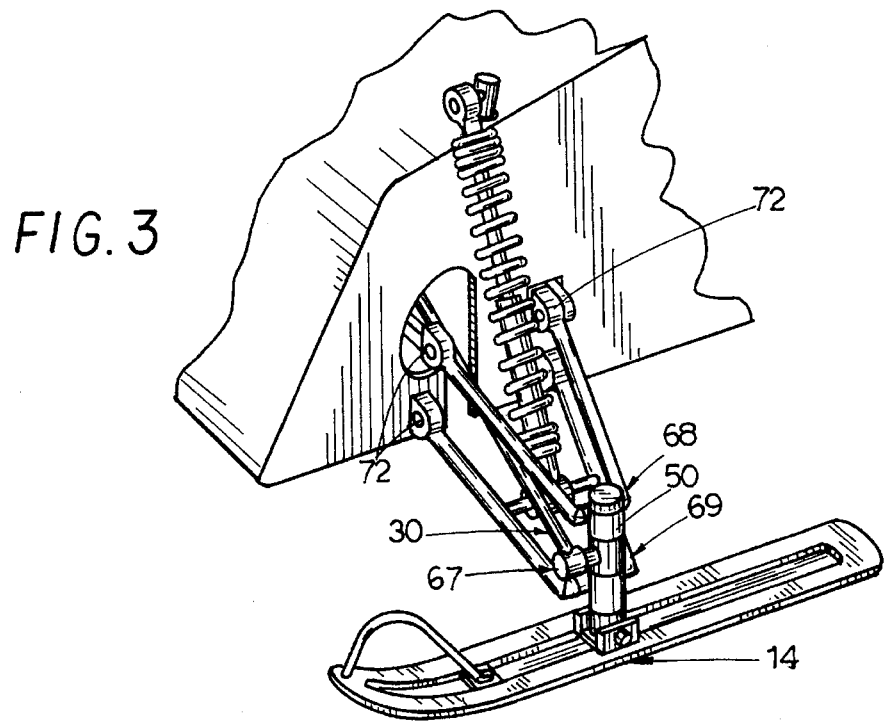
FIG. 3 is a fragmentary perspective of the suspension system, the steering mechanism, and the left front ski of the snow vehicle.
Figure 4:
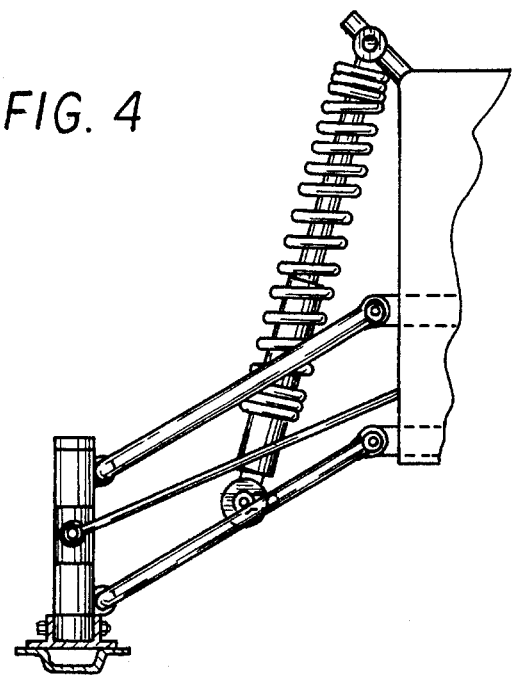
FIG. 4 is a rear fragmentary elevational section of the steering mechanism, the suspension system, and the left front ski of the snow vehicle.
Figure 5:
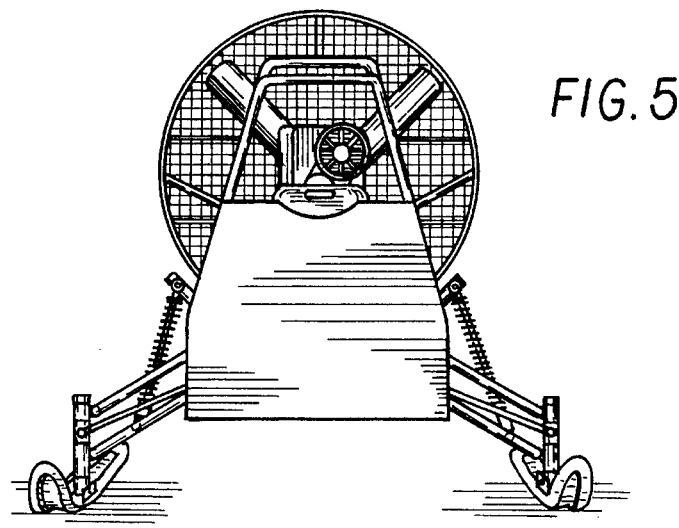
FIG. 5 is a front elevational view of the snow vehicle.
Figure 6:
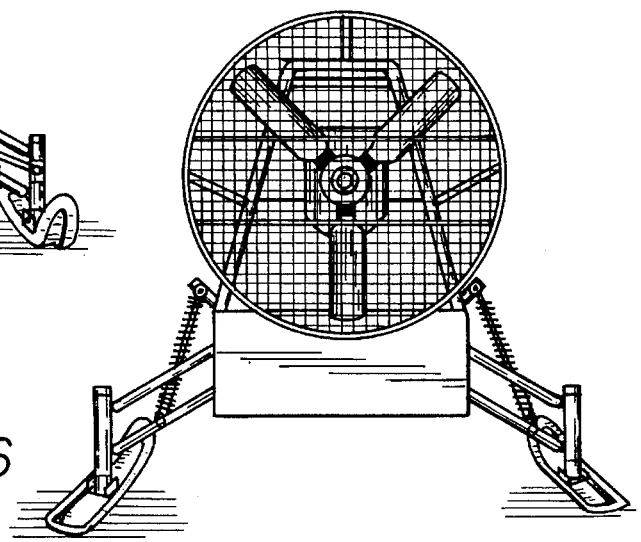
FIG. 6 is a rear elevational view of the snow vehicle.
Figure 7:
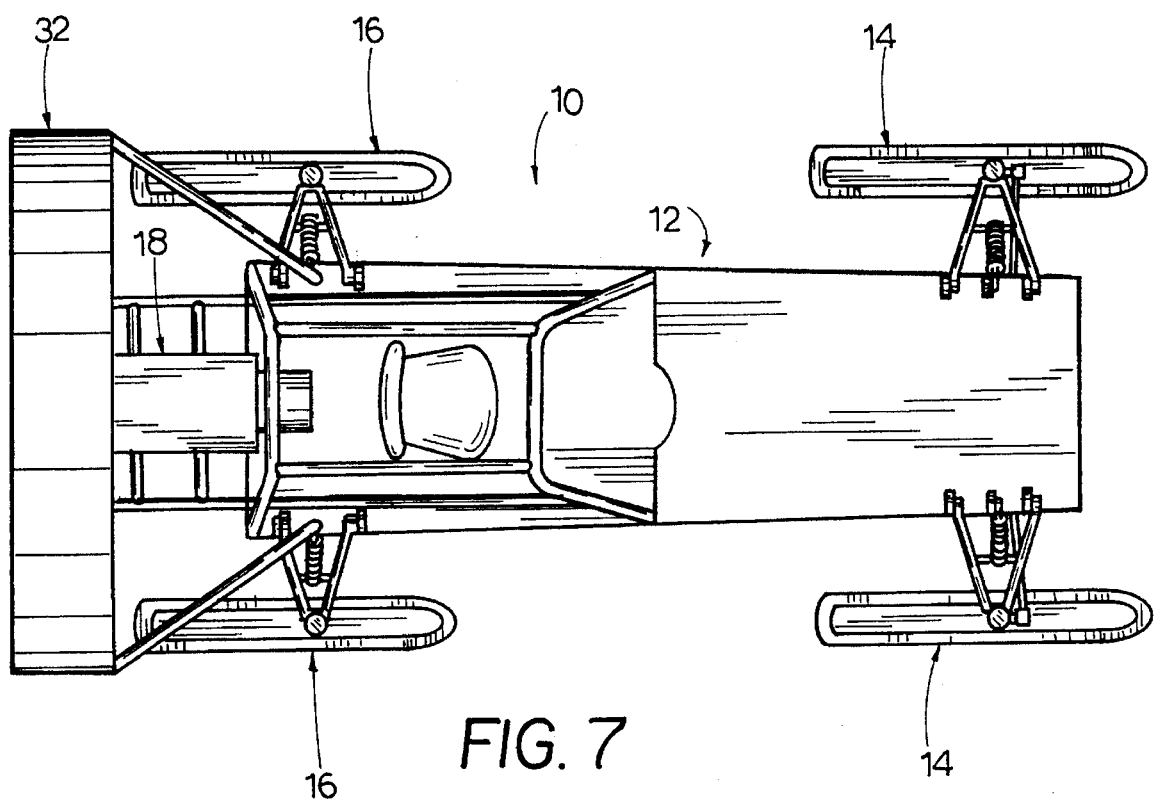
FIG. 7 is a top plan view of the snow vehicle.

Returning now to the description of the operation of the skis, reference is made to FIGS. 2–4. To maintain maximum control and stability of the skis, it is desirable to maintain control over the orientation of the skis and to maintain maximum surface area of the skis on the terrain. The skis must be able to tilt forwards and backwards to track the terrain without unduly stressing the skis. It has been found, however, that side to side listing or tilting of the skis reduces the amount of control and stability of the ski vehicle. In order to maximize the amount of contact of the skis with the terrain and keep the skis from listing, each of the skis is connected to the frame of the vehicle by a novel parallelogram suspension system. The suspension system allows each ski to travel through a wide range of vertical motion without allowing the ski to tilt to either side. By keeping the sides of the skis level, the loading of the outside edge of the skis during turns will be directed into the snow or ice under the skis. Because the vehicle can turn more quickly under control when the edge of the ski contacts the snow or ice, rather than only the flat bottom of the ski contacting the snow or ice, the vehicle has a greatly enhanced turning capability with the current suspension system. The sharp edges of the skis are much less prone to sliding out under the centrifugal turning loads than the slick bottom side of the skis. When the snow buggy is travelling in a straight line, the suspension system keeps the smoother bottom portion of the skis flat on the terrain to provide maximum glide.

Each ski (14,16) is attached through a bracket means (51) to a vertical spindle (68) through a bracket means (51) welded or bolted to the ski and to the spindle (68) by pin 53. The bracket means is attached to the ski and spindle in such a way by pin 53 that the ski can tilt forwards or backwards. The ability of the skis to tilt in these directions allows the skis to track the terrain with a maximum amount of contact between the ski and the ground. A brace (36) is attached to the front portion of the ski to stiffen the front end of the ski to aid the ski in absorbing impacts from sudden changes in terrain.

On the rear skis, a separate set of bolts (70) fix the spindle inside the bushing housing (50) and prevent the spindle (68) from rotating relative to the bushing (50). By adjusting the amount of play of the bolts (70) inside the bushing housing, the amount of left to right float of each rear (between a toed in and toed out position) can be controlled.

The front skis (14) are connected to the steering wheel (28, see FIG. 1.) through a control rod (30) best seen in FIGS. 3 and 4. The vertical bushing housing on the front skis has been modified to receive a central spindle collar (69) which can rotate independently of the bushing housing. The spindle collar is connected to the spindle (68) through a pin which terminates in a connector (67) for receiving the end of the control arm (30) as clearly seen in FIG. 3. The connector has sufficient degrees of freedom to engage the control arm throughout the complete range of motion of both the steering wheel and the suspension system.

When the operator turns the steering wheel (28), appropriate conventional gearing (not shown) causes the control rod (30) to push against the connector and connecting pin (67). The connector which is attached to the spindle collar (69) rotates under the load from the control arm causing the spindle to turn within the bushing housing (50). The spindle causes the bracket 51 to rotate, turning the ski in the desired direction. In a like manner the front opposite ski is turned concurrently by the steering wheel as the respective control arm pulls on the respective connector and connecting pin.

Side to side listing of the skis is prevented by the bracket (51) and spindle (68). When the spindle (68) and bushing housing (50) are vertical, then each ski (14,16) will be in the proper orientation. The parallelogram suspension system maintains the spindle and bushing housing in a proper vertical orientation throughout the vertical oscillations of the suspension system and skis.

The parallelogram suspension system includes two upper linkages or a first pair of linkage arms (52 and 54) and two lower linkages or a second pair of linkage arms (56 and 58) which are connected to the main body of the snow vehicle by a first and a second pair of hinges (72) respectively or the like. The top two linkages (52 and 54) are connected at their opposite end to an upper portion of the bushing housing (50), and the bottom two linkages (56 and 58) are connected to a lower portion of the bushing housing (50). The bushing housing (50) has two smaller, horizontal bushings (64 and 66) to receive the ends of the pairs of linkage bars (52 and 54, 56 and 58, respectively) such that the bars can freely rotate relative to the bushing housing. The hinges, horizontal bushings and linkages are arranged such that the top two linkages are in a plane parallel to the bottom two linkages and the hinges (72) are in a plane parallel to the horizontal bushings to form a parallelogram. Thus when a change in terrain under one ski causes that ski to rise or fall, the spindle (68) and bushing housing (50) remain parallel to the main body of the vehicle regardless of the amount of vertical travel of each ski.

A horizontal brace (60) located between the midpoint of each of the two bottom linkages (56 and 58) connects the two linkages together. A conventional shock absorber (62) with a coil spring guide is mounted on the brace (60) and connects the brace to a hinge (61) on the main body. The shock absorber limits the amount of travel the suspension system undergoes and dampens the shock to the vehicle from such travel. The shock absorber also returns the ski to its neutral position when the terrain returns to level. The dampening and spring force of the shock absorber can be selected according to the expected terrain and desired ride comfort and other needs of the driver.

The result of the improvements of the present invention provides greatly enhanced stability and responsiveness that is not found in the earlier snow vehicles. The ease of operation of the current vehicle and its ability to adapt and adjust to varying terrain create a powerful and advantageous machine. The snow buggy is the first serious competition to the snowmobiles which are currently dominating winter land paths. The snow buggy has the increased advantage in its air powered thrust in that it does not rely on the traction between the vehicle and the ground to move the vehicle allowing the snow buggy to accelerate easily, even when resting on a sheet of ice.

The improved suspension system maintains better control of the skis aiding in the stability and responsiveness of the vehicle to the user inputs. The parallelogram suspension system allows the skis to travel independently through large vertical oscillations as the terrain varies while maintaining proper orientation of the skis.

While a single passenger vehicle has been described, the passenger compartment and dimensions of the vehicle could easily be altered to accept two passengers in a tandem or a side by side arrangement. Compartments for more than two could also be developed, but the size increases would obviously be detrimental to the flexibility of the vehicle to fit through narrow openings and would increase the bulkiness of the vehicle.

It is to be understood that the present invention is not limited to the sole embodiment described above, but encompasses any and all embodiments within the scope of the following claims.

I claim:

1. A propeller driven snow vehicle comprising:
   a main compartment for carrying at least one passenger, said compartment having opposite sides and a front and rear portion;
   a steering wheel within said compartment;
   a motor attached to said rear portion of said main compartment;
   a propeller attached to and driven by said motor;
   four skis including a front pair of skis attached to opposite sides of said front portion of the passenger compartment, there further being a suspension system comprising a first suspension means for supporting said front pair of skis, and a rear pair of skis attached to opposite sides of said rear portion of the passenger compartment, there further being second suspension means for supporting said rear pair of skis;
   said first and second suspension means includes:
   a first upper and second lower pair of hinges mounted on said main compartment;
   a bushing housing and a vertical spindle mounted on a said ski, said bushing housing having an upper and a lower section;
   a first pair of linkage arms connecting said first pair of upper hinges to said upper section of said bushing housing;
   and a second pair of linkage arms connecting said second pair of lower hinges to said lower section of said bushing housing; whereby
   said suspension system, said first upper and second lower pair of hinges, said first and second pair of linkage arms, and said bushing housing form a parallelogram; and
   means interconnecting said steering wheel and said front pair of skis for operably rotating said front pair of skis in a predetermined manner.

2. The snow vehicle according to claim 1, wherein said suspension system further includes:
   a horizontal brace connecting each of said second pair of linkage arms together;
   a hinge connected to said vehicle main compartment; and
   a shock absorber connected between said hinge on said main housing and said brace.

3. The snow vehicle according to claim 2, wherein said suspension system further includes a coil spring guide mounted to said shock absorber.

4. The snow vehicle according to claim 1, further comprising bushings connecting said first and second pair of linkage arms to said bushing housing.

5. The snow vehicle according to claim 1, wherein each of said skis include bracket means for rotationally mounting each said ski, and confining the rotation of each said ski within a vertical plane.

6. A parallelogram ski suspension system for a propeller driven snow vehicle comprising:

a first suspension means for supporting and steering a front pair of skis;

a second suspension means for supporting a rear pair of skis;

a first upper and a second lower pair of hinges connected to each of said first and second suspension means;

a bushing housing and a vertical spindle mounted on each of said front and rear pairs of skis, said bushing housing having an upper and a lower section;

a first pair of linkage arms connecting said first upper pair of hinges to said upper section of said bushing housing;

a second pair of linkage arms connecting said second lower pair of hinges to said lower section of said bushing housing;

whereby the first and second pair of hinges, the first and second pair of linkage arms, and said bushing housing form a parallelogram for each of the first and second suspension means.

7. The parallelogram suspension system according to claim 6, wherein said suspension system further includes;

a horizontal brace connecting each of said second pair of linkage arms together;

a hinge connected to a side of a propeller driven snow vehicle, and a shock absorber connected between said hinge on said side of said vehicle and said brace.

8. The parallelogram suspension system according to claim 7, wherein said suspension system further includes a coil spring guide mounted to said shock absorber.

9. The parallelogram suspension system according to claim 6, further comprising bushings connecting said first and second pair of linkage arms to said bushing housing.

10. The parallelogram suspension system according to claim 6, wherein each of said front and rear skis include bracket means for rotationally mounting each said ski, and confining the rotation of each said ski within a vertical plane.

11. The parallelogram suspension system according to claim 6, wherein said bushing housing of each of said rear skis includes means for adjusting the float of said rear skis between toe-in and toe-out.

\* \* \* \* \*